UNITED STATES PATENT OFFICE.

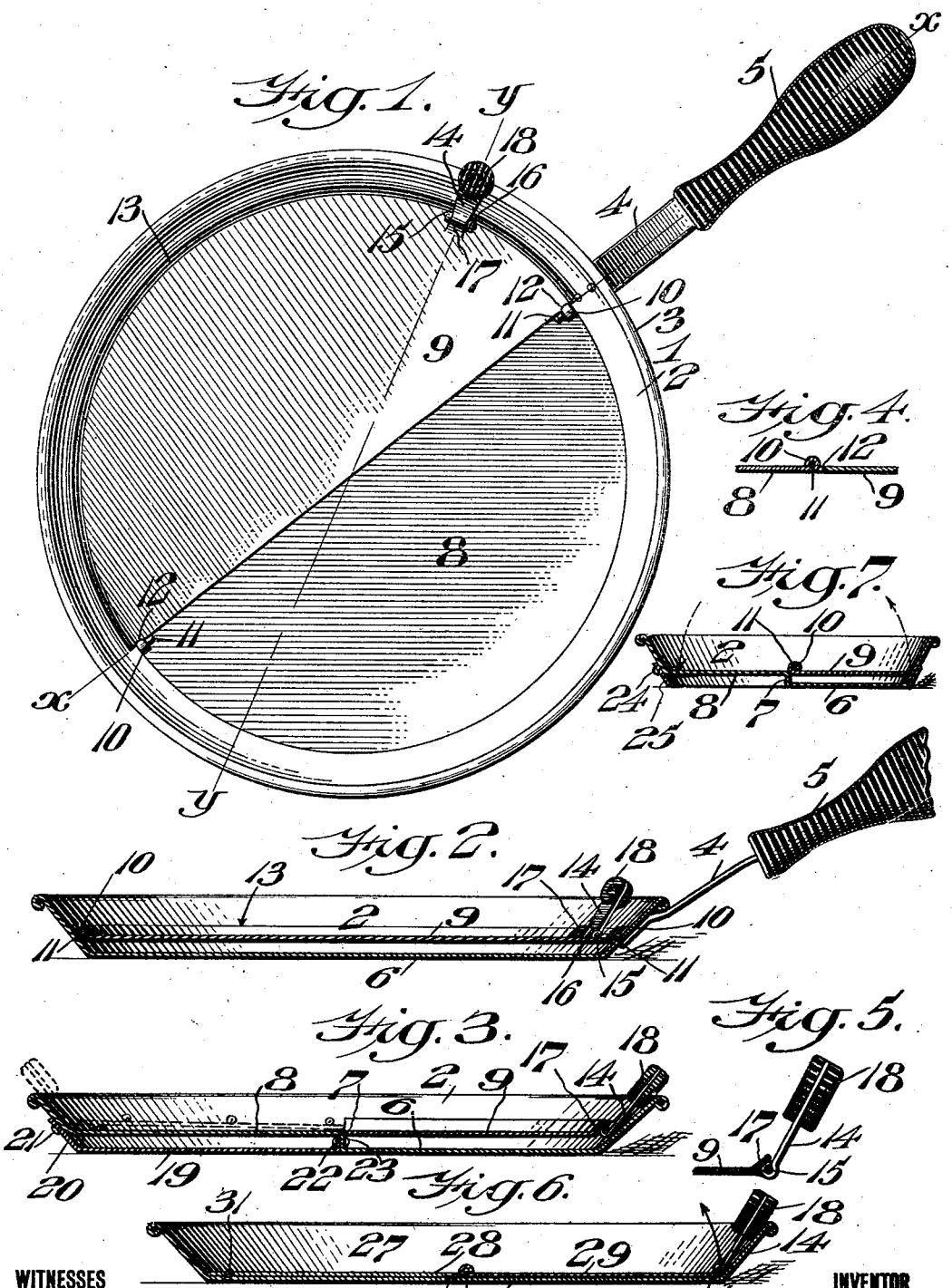

HELEN R. FRENCH, OF PHILADELPHIA, PENNSYLVANIA.

CULINARY DEVICE.

933,545.  Specification of Letters Patent.  Patented Sept. 7, 1909.

Application filed April 29, 1909. Serial No. 492,842.

*To all whom it may concern:*

Be it known that I, HELEN R. FRENCH, a citizen of the United States, residing in the city and county of Philadelphia, State of Pennsylvania, have invented a new and useful Culinary Device, of which the following is a specification.

My present invention consists of a novel construction of a culinary device wherein means are provided for turning the articles of food which are being cooked so that the same are browned on both sides without any liability of the articles of food, such as omelet, shad-roe, potatoes and the like becoming broken or crumbled and the same are turned or folded over to form a single unbroken and attractive appearing article of food.

In my prior patent 924,336, patented June 8, 1909, I have described and broadly claimed a novel construction of a culinary device wherein the same is provided with a sectional false bottom one of the sections being fixed and the other section thereof movable, said sections being located within the sides of the pan and in my present invention I have devised a novel construction of culinary device wherein the pan is provided with a sectional bottom one of said sections being fixed and the other movable, the movable section being pivoted in a novel manner with respect to the fixed section so that the movable section may be closely folded upon the fixed section.

It further consists of a novel construction of a sectional bottom comprising a fixed and a movable section and a novel manner of securing the operating handle to such movable section, so that the handle is readily accessible to the operator at all times, immaterial of the position which the movable member assumes.

It further consists of a novel construction of a movable member and an operating handle provision being made for preventing the grasping handle coming in contact with the food which is being prepared.

It further consists of a novel construction of a culinary device wherein the fixed member of the sectional bottom is secured in close proximity to the bottom of the pan.

It further consists of a novel construction of a culinary device wherein the bottom of the pan is deflected upwardly and then rearwardly to form a fixed food supporting surface such laterally extending portion having hinged thereto a movable section forming a movable food supporting surface, the side of the pan being provided, if desired, with an annular ring secured thereto in any suitable manner.

It further consists of other novel features of construction, all as will be hereinafter fully set forth.

For the purpose of illustrating my invention, I have shown in the accompanying drawing those forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan view of a culinary device for preparing omelets and other articles of food, embodying my invention. Fig. 2 represents a section on line $x$—$x$, Fig. 1. Fig. 3 represents a section on line $y$—$y$, Fig. 1. Fig. 4 represents a sectional view of a portion of my device showing more particularly the manner in which the movable section is connected with the fixed section. Fig. 5 represents a sectional view of a portion of the device showing more clearly the manner in which the handle is prevented from falling over so as to come in contact with the food being prepared. Fig. 6 represents a sectional view of another embodiment of my invention. Fig. 7 represents a sectional view of another embodiment of my invention.

Similar numerals of reference indicate corresponding parts in the figures.

Referring to the drawings, 1 designates a culinary device or pan embodying my invention the same being provided with the sides 2, the upper portion of which is preferably deflected upon itself to form a reinforced rim or edge 3, the sides 2 having secured thereto in any suitable manner a handle 4, the grasping portion 5 of which is preferably formed of suitable insulating material thereby preventing the hands of the operator from becoming burned or unduly heated.

Referring first to the embodiment seen in Figs. 1, 2 and 3, it will be seen that in the present instance, I have formed integral with the sides 2, the bottom 6, which may be of any desired area, in the present instance, the same covering substantially one-half of the bottom surface of the device or pan, it being noted that this bottom member 6 is deflected upwardly, as indicated at 7, and then deflected laterally, as indicated at 8, thereby forming a food supporting bottom member which is located in a different plane from the bottom member 6, it being understood that in practice the sides 2 and the bottom members 6 and 8 are formed by means of suitable dies.

9 designates the movable food supporting member which is mounted in such a manner that it is normally in substantially the same plane as the fixed food supporting member or section 8, it being seen that the member 8 has formed therefrom or secured thereto the ears 10 in which are mounted the pins 11 carried by the movable section 9, whereby the movable section 9 is suitably hinged with respect to the fixed section 8, it being preferable to locate the pins 11 and the ears 10 in such a manner that the pivotal point thereof is above the plane of the members 8 and 9 when the same are in their normal position. If desired the movable member 9 in proximity to the ears 10 may be slightly recessed or deflected, as indicated at 12. The outer periphery of the movable member 9 is preferably upwardly deflected, as indicated at 13, in order to prevent the article being cooked passing beneath the movable member 9.

The handle 14 is secured to the movable member, in the present instance, by being secured by means of the pin 15 and the ears 16, which latter are preferably formed integral with the section 9 which may be separate therefrom and connected therein in any suitable manner if desired.

A portion of the material of the section 9 is deflected upwardly to form a stop 17 thereby preventing the handle 14 from coming in contact with the food which is being prepared. This handle 14 is preferably provided with a nonconducting grasping portion 18 which is secured thereto in any suitable manner.

In some cases it is advantageous to have the bottom of the pan, which rests on the stove or other source of heat, in the same horizontal plane and if desired a bottom section 19 may be employed which may be secured to the pan in any desired way and as seen in Fig. 3, is deflected upwardly at its outer periphery, as indicated at 20, and secured to the sides of the pan by any suitable means, in the present instance, by fastening devices 21, it being noted that the inner edge of the member 19 is upwardly deflected, as indicated at 22, in order that the same may be secured to the upwardly extending portion 7 by means of suitable fastening devices 23, although it will be apparent that if desired this member 19 may be omitted but in such cases it is preferable in any instances to secure to the sides 2 of the pan, by any suitable fastening devices, such as 24, a supporting member 25 the lower edge of which is in the same plane as the bottom member 6, although such member may be dispensed with if desired.

I have also found it advisable in some cases to form the bottom 26 of the pan in the same horizontal plane and preferably integral with the sides 27. Within the pan is the false bottom formed of the sections 28 and 29, which are movably connected together in any desired manner, as by the member 30 in the same manner as already described with reference to the other figures of the drawing. An operating handle 14 is secured to one of the members so that the same can be readily moved with respect to the other as previously described. In some instances it may be advisable to connect one of the members, as for example, the member 28, with the pan, in any desired manner, as for example, by means of the pins or rivets 31.

The operation of the device will be readily apparent to those skilled in the art to which this invention appertains, it being apparent that when it is desired to turn or fold over the article being cooked it is simply necessary to manipulate the handle 14 whereby the movable section will be folded over into close proximity to the other section and if desired the food can be pressed together to give the same the desired contour.

It will be apparent that in all the embodiments of my invention I employ a sectional support for the food which is being cooked, one of the sections being fixed and the other movably mounted so that it can be folded over upon the other section and both of said sections being located within the pan in such a manner that the desired heat will be imparted thereto and one side of the food can be turned or transferred from one section to the other.

Having thus described my invention what I claim as new and desire to secure by Letters Patent is:—

1. In a pan, sides and a bottom integral with said sides, a portion of said bottom being upwardly and laterally deflected to form a fixed food supporting member, and a movable food supporting member extending normally in substantially the same plane as the fixed food supporting member.

2. In a pan, sides and a bottom integral with said sides, a portion of said bottom being upwardly and laterally deflected to form a fixed food supporting member, a movable food supporting member extending normally in substantially the same plane as the fixed food supporting member, and a handle suitably secured to said movable member.

3. In a pan, sides and a bottom secured thereto and integral therewith, a portion of said bottom being deflected laterally in a different plane from the other portion to form a fixed food supporting member, and a movable member pivotally mounted with respect to said fixed member, the pivotal point being located above the horizontal plane of said members.

4. In a pan, sides and a bottom integral therewith, said bottom having a portion thereof deflected upwardly and laterally to form a fixed food supporting member, a movable food supporting member pivotally mounted with respect to said fixed member and normally in alinement therewith, and a member secured to said pan beneath said fixed member, the lower portion of which is in alinement with the other portion of said bottom.

5. In a pan, sides and a bottom integral therewith, a portion of said bottom being deflected upwardly and laterally to form a fixed food supporting member, said fixed member having ears connected therewith, a movable member having pins mounted in said ears whereby said movable member can be folded over into proximity to said fixed member, and an actuating handle suitably connected with said movable member.

6. In a pan, sides and a bottom integral therewith, said bottom having a portion thereof deflected to form a fixed food supporting member, a movable food supporting member pivotally supported with respect to the fixed member and normally extending in substantially the same plane, a handle suitably connected with said movable member, and means for preventing said handle coming in contact with the food supporting surface of the movable member.

7. In a pan, sides and a bottom integral therewith, a portion of said bottom being upwardly and laterally deflected to form a fixed food supporting member, a movable member pivotally supported with respect to said fixed member and normally in alinement therewith, and a support secured to the side of the pan, the lower edge of said support being in the same plane as the lower portion of the bottom.

8. In a pan, sides, a handle connected therewith, and a bottom for said pan, a portion of said bottom being upwardly and laterally deflected to form a fixed food supporting member, a movable member pivotally mounted with respect to said fixed member and having its inner edge in close proximity thereto, the outer perimeter of said movable member being upwardly deflected and adapted to closely engage the sides of the pan, a handle suitably connected with said movable member, and an independent bottom member in alinement with the lower portion of the bottom of the pan and secured to the side.

9. In a pan, sides and a bottom integral therewith, a sectional bottom comprising a fixed member secured in close proximity to the bottom, said member having ears connected therewith to which the movable member is pivoted, and a handle suitably connected with the movable member.

10. In a pan, sides and a bottom, and a sectional bottom within the pan below the top of the sides, one of said sections being pivotally supported above the food supporting surface thereof, and adapted to be folded over in close proximity to the other, and said sections being normally in alinement.

HELEN R. FRENCH.

Witnesses:
WM. CANER WIEDERSEIM,
C. D. McVAY.